United States Patent Office 3,105,652
Patented Oct. 1, 1963

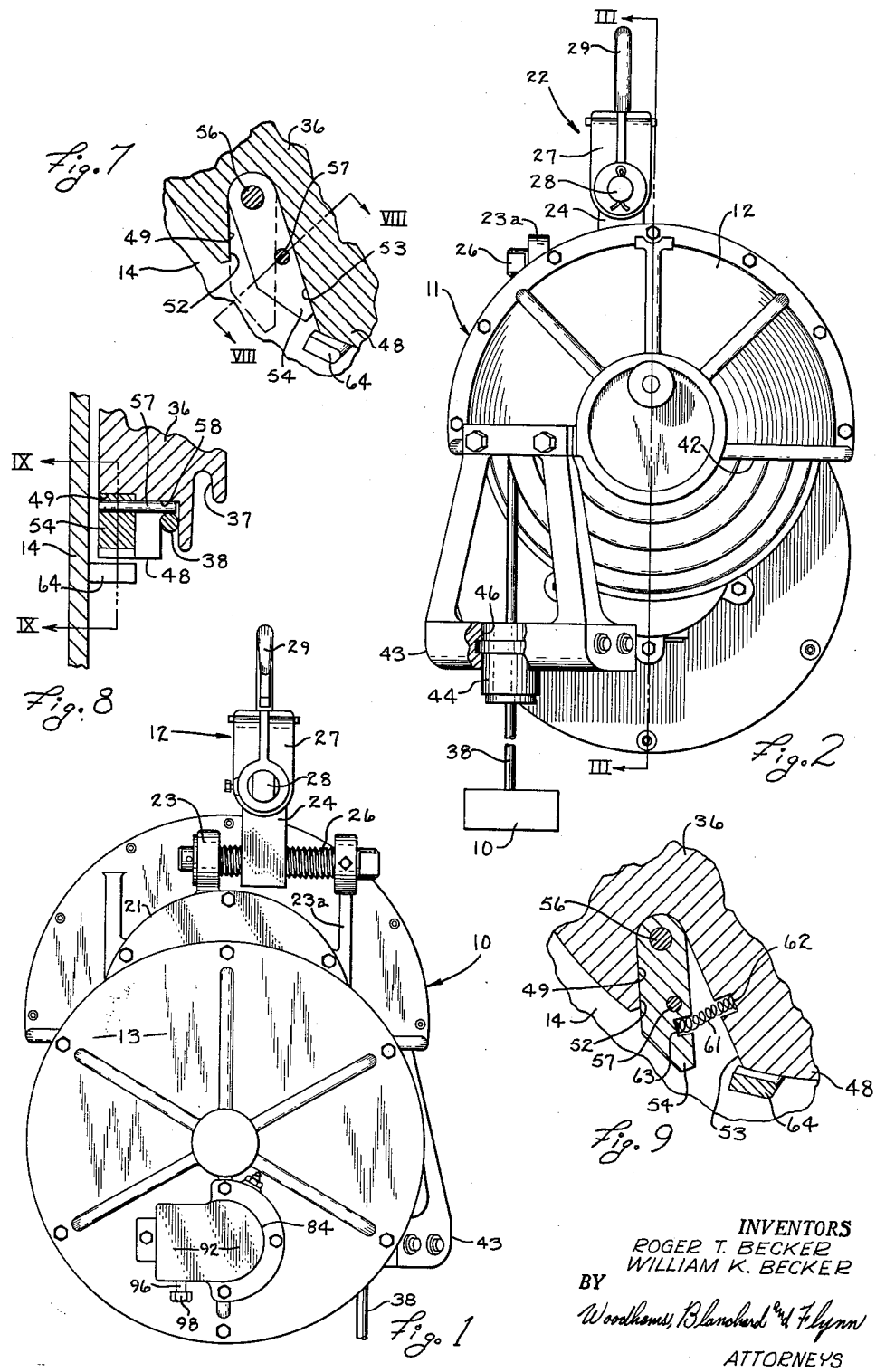

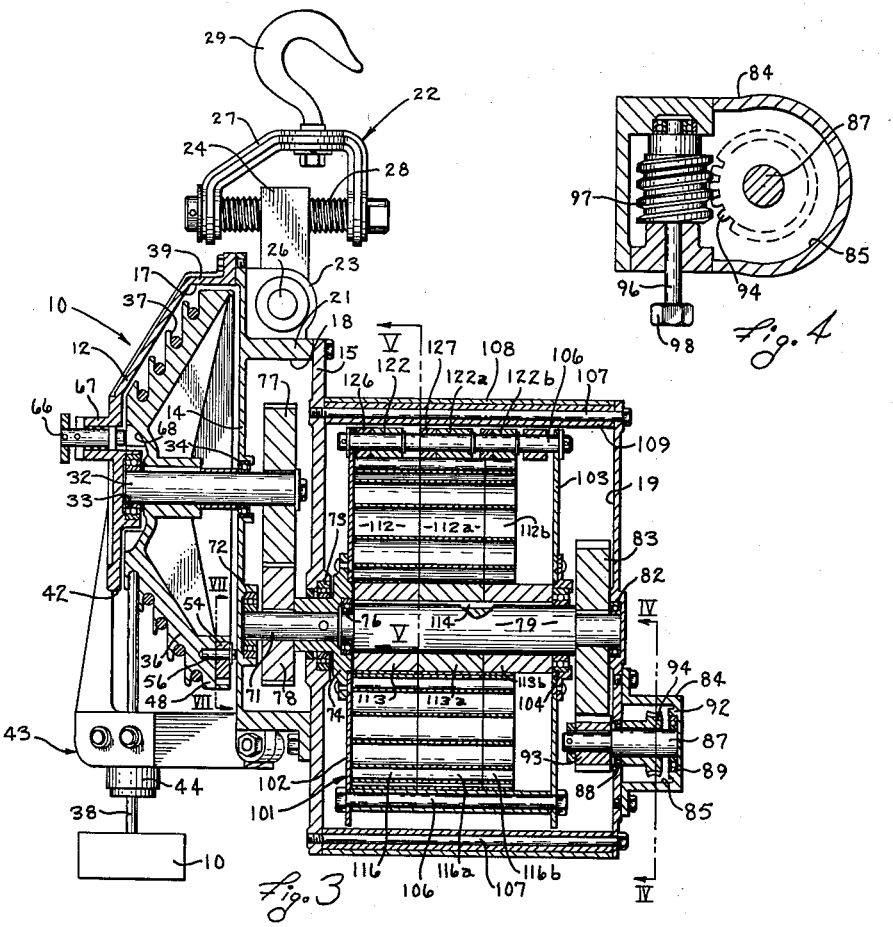

3,105,652
APPARATUS FOR SUPPORTING A HEAVY LOAD
Roger T. Becker, Portage Township, Kalamazoo County, and William K. Becker, Ross Township, Kalamazoo County, Mich., assignors to Aero-Motive Manufacturing Company, Kalamazoo, Mich., a corporation of Michigan
Filed Mar. 1, 1962, Ser. No. 176,633
9 Claims. (Cl. 242—107.4)

This invention relates in general to a reel structure and, more particularly, to a type thereof for safely suspending a heavy load in static equilibrium at various elevations between which said load can be manually and safely moved with a minimum of exertion.

The use and operation of balance reels, upon which the present invention is an improvement, are well known. Balance reels are especially useful for suspending objects, such as tools, parts being worked upon by a mechanic, or similar equipment which must be raised and lowered. Generally speaking, balance reels have been widely and successfully used to support relatively light objects, such as those which do not exceed approximately 100 pounds. However, previous efforts to develop heavy-duty balance reels for the support of heavy loads, such as loads of approximately 500 pounds or more, have encountered a variety of problems.

In the first place, existing balance reels for heavy-duty service have been large, heavy and cumbersome. Moreover, it has often been difficult to adjust and maintain a free-floating balance in these heavy-duty reels. In the second place, large balance reels have not been as sensitive as desired, because they have required large, heavy-duty springs which are stiff and sometimes erratic. It is extremely difficult to fabricate a coil spring which is capable of opposing strong forces and which is also sensitive to small forces. However, these are the prime requisites for a completely acceptable balance reel capable of supporting heavy loads at various elevations.

Heavy-duty balance reels are often, if not usually, installed or used where severe damage to equipment and/or serious injury to personnel can result from a failure in the spring mechanism which opposes the unwinding movement of the cord-supporting drum. Existing safety devices, like heavy-duty reels, have been patterned from similar structures previously used in light-duty balance reels. Thus, even though they may be completely satisfactory where small loads are involved, these safety devices are not reliable for heavy loads. The shock of stopping a relatively small load, even after its movement away from the cord reel has reached a high velocity, can be absorbed without damage or danger by a reel structure and cable of conventional strength. However, where the load is in excess of 500 pounds, a cord reel structure may be fully capable of supporting the load in a static position or stopping movement of the load at a relatively low velocity without damage to the reel or the load. However, if the movement of the load gets out of control, as where a spring breaks, the reel structure may be seriously damaged if such movement is suddenly stopped by a brake on the reel.

Accordingly, a primary object of this invention has been the provision of an improved apparatus for suspending a heavy article in a balanced position within a range of such positions between which said article can be manually moved with a minimum amount of physical exertion.

A further object of this invention has been the provision of an apparatus, as aforesaid, having a resilient rewind mechanism which is very compact in size, which is very sensitive to small forces, which can be accurately and easily adjusted and which is capable of supporting much heavier loads than existing resilient power means of substantially the same size and cost.

A further object of this invention has been the provision of an apparatus, as aforesaid, having a fast operating and positive-acting brake means for preventing the fall of the load in the event that the resilient power means fails.

A further object of this invention has been the provision of an apparatus, as aforesaid, which is capable of continuous, safe operation for its intended purpose, which can be operated by any person able to operate a conventional balance reel, which requires little or no maintenance, which is relatively light in weight and inexpensive to manufacture by comparison with the load which it is capable of supporting, and which requires a minimum of space when in operating position.

Other objects and purposes of this invention will become apparent to persons familiar with this type of equipment upon examining the accompanying drawings, in which:

FIGURE 1 is an end elevational view of a cord reel structure embodying the invention, as viewed from the power end of the reel.

FIGURE 2 is an end elevational view of said cord reel structure as seen from the drum end of the reel.

FIGURE 3 is a sectional view taken along the line III—III in FIGURE 2.

FIGURE 4 is a sectional view taken along the line IV—IV in FIGURE 3.

FIGURE 5 is a sectional view taken along the line V—V in FIGURE 3.

FIGURE 6 is a fragment of FIGURE 5 showing parts thereof in different positions of operation.

FIGURE 7 is a sectional view taken along the line VII—VII in FIGURE 3.

FIGURE 8 is a sectional view taken along the line VIII—VIII in FIGURE 7.

FIGURE 9 is a sectional view taken along the line IX—IX in FIGURE 8.

For convenience in description, the terms "upper," "lower" and words of similar import will have reference to the apparatus of the invention as appearing in FIGURES 1, 2 and 3. The terms "inner," "outer" and derivatives thereof will have reference to the geometric center of said apparatus and parts thereof.

*General Description*

The objects and purposes of the invention including those set forth above, have been met by providing an improved balance reel comprised of a housing structure connected to a support device for suspending said housing structure from a suitable support. A conical drum is rotatably supported upon first shaft means within said housing structure, and a load-engaging cable is connected to the drum. Second shaft means is rotatably supported within said housing structure and connected by gear means to the first shaft means. One or more coil springs are disposed within said housing structure so that they encircle said second shaft means, one end of each spring being connected to said second shaft means and the other end thereof being connected to said housing structure.

A first brake mechanism is connected to said second shaft means for engaging stops on the housing structure and thereby preventing unwinding rotation of the drum in response to a failure of one or more of said coil springs. Second brake mechanism is mounted upon said drum for engagement with said housing structure when a predetermined amount of cable has been unwound therefrom.

Detailed Construction

The apparatus disclosed in FIGURES 1, 2 and 3, which illustrates a preferred embodiment of the invention, is specifically designed for supporting a heavy load 10 in a balanced position so that said load can be manually moved upwardly and downwardly with respect to said apparatus by applying a minimum amount of force to the object. Said apparatus, also referred to herein as a balance reel, is comprised of a housing or frame structure 11 having axial end walls 12 and 13. Spaced partitions 14 and 15, which are substantially parallel with the end walls 12 and 13, divide the interior of said housing into three compartments 17, 18 and 19.

A support device 22 (FIGURES 1 and 3) has a pair of mounting brackets 23 and 23a, which are rigidly and preferably secured to the upper side of the circumferential wall 21 surrounding the central compartment 18 of the housing 11. A pivot member 24 is pivotally supported upon and threadedly engaged by the threaded pivot shaft 26, which is rotatably supported upon and between the mounting brackets 23 and 23a. A pivot yoke 27 is pivotally connected to a threaded shaft 28 which is threadedly received through the upper end of the pivot member 24. The shaft 28 is preferably disposed at right angles to the lengthwise extent of the shaft 26. By rotating the shaft 26 with respect to the pivot member 24, said pivot member can be moved lengthwise of said shaft to adjust the load-supporting point thereon. By rotating the shaft 28 with respect to the pivot member 24, said pivot member is moved with respect to the yoke to adjust the load-supporting point thereon. A hook 29 or similar fastening device is pivotally secured to the yoke 27 for rotation around an axis perpendicular to the axis of the shaft 28.

A drum shaft 32 (FIGURE 3) is rotatably supported upon bearings 33 and 34 mounted in the end wall 12 and partition 14, so that said shaft extends through the drum compartment 17 and into the central compartment 18. The drum shaft 32 is preferably in a substantially horizontal position when the balance reel is suspended by the hook 29. A conical drum 36 having a volute groove 37 in the peripheral surface thereof is mounted upon the shaft 32 for rotation therewith. A cable 38 is secured at one end thereof within the groove 37 adjacent the larger end 48 of the drum 36, so that said cable can wrap around said drum within said groove 37 toward the smallest diameter of said drum.

The circumferential wall 39 (FIGURE 3) defining the drum compartment 17 has an enlarged opening 42 across its lower end so that the cable 38 can move both vertically and horizontally, as it unwinds from the drum, without interference from or with said housing structure. A cable guide 43 is rigidly secured to the housing structure 11 beneath the compartment 17 (FIGURE 2) for slidably engaging said cable 38 and guiding its vertical movement. For this purpose, the cable guide 43 has a guide element 44 movably mounted in an elongated slot 46 which is located so that the guide element 44 can always be directly below the part of the groove 37 from which the cable 38 is hanging.

As shown in FIGURES 7, 8 and 9, the larger, rightward end 48 of the drum 36 has a slot 49 which opens through both the axial and circumferential surfaces of said drum, adjacent the radially outer edge of the partition 14. The walls 52 and 53 (FIGURES 7 and 9) of the slot 49 preferably diverge radially outwardly with respect to each other. A pawl 54 is pivotally supported near one end thereof upon the pivot pin 56 which is secured to the drum 36 and extends into the slot 49 near the radially inner end thereof and is preferably parallel with the shaft 32. A cable-engaging pin 57 is rigidly secured to the pawl 54, approximately midway between the ends thereof, and extends therefrom in a direction substantially parallel with the pivot pin 56. The pin 57 (FIGURE 8) is slidably receivable into a radial recess 58 which communicates between said slot 49 and the volute groove 37 near the large end of the drum 36. The recess 58 extends beneath the groove 37 so that the pin 57 can be located within the recess 58 beneath the cable 38, which is disposed in the groove 37. Thus, as shown in FIGURE 8, the cable 38 can hold the pin 57 within the recess 58, and thereby hold the pawl 54 within the slot 49 so that it does not extend beyond the circumference of the drum 36.

Resilient means, such as the spiral spring 61, is disposed with its opposite ends received into the opposing recesses 62 and 63 in the inner wall 53 of the slot 49 and the opposing surface of the pawl 54. Said spring 61 is under compression so that it continually urges the pawl 54 toward the outer wall 52, whereby the outer free end of the pawl 54 projects radially beyond the adjacent, circumferential surface of the drum 36.

A stop member 64 (FIGURES 7 and 9) is rigidly secured to the partition 14, for example, adjacent the large end 48 of the drum 36, so that the slot 49 passes under the stop member when the drum is rotated. Thus, the outer end of the pawl 54 can engage the stop member 64 when the cable 38 (FIGURE 8) releases the cable-engaging pin 57 from within the slot extension 58 and, accordingly, the spring 61 can urge the pawl 54 into its extended position of FIGURE 9. The pawl 54 and its stop member 64 are arranged so that their engagement positively prevents further rotation of the drum 36 in an unwinding direction. However, such engagement can occur only when the cable 38 is substantially completely unwound from the drum 36, and the cable must move out of that portion of the groove 37 behind which the recess 58 extends. The operation of the pawl 54 is substantially automatic.

A stop post 66 (FIGURE 3) is slidably supported within a sleeve 67, which is mounted upon the end wall 12 of the housing. Said post 66 is substantially parallel with the drum shaft 32 and is spaced radially therefrom. The axial end of the drum 36, which is adjacent the wall 12, has a recess 68 into which the stop post 66 can be urged for locking the drum 36 against rotation with respect to the housing 11. The stop post 66 is advantageously used to hold the drum 36 in a fixed position when it becomes desirable to move the load 10 in a sidewise or nonvertical direction, or when the load 10 is being connected to or removed from the cable 38.

A transmission shaft 71 (FIGURE 3) is rotatably supported within the bearings 72 and 73, which are mounted upon the partitions 14 and 15, preferably so that the shaft 71 is parallel with and radially spaced substantially from the drum shaft 32. The transmission shaft 71 extends through the partition 15 into the power compartment 19. A flanged collar 74 is secured to and is supported upon the extended end of the shaft 71 so that the flange is disposed in the power compartment 19. A pilot bearing 76 is coaxially disposed within the axial face of the flanged collar 74 facing into the compartment 19. A pair of gears 77 and 78 are rigidly mounted upon the portions of the shafts 32 and 71, respectively, disposed within the central compartment 18, and the teeth on said gears are engaged for simultaneous rotation.

An adjustment shaft 79 (FIGURE 3) extends between and is rotatably supported by the pilot bearing 76 and the bearing 82 in the end wall 13 of said housing structure 11. A gear 83 is coaxially secured to and upon the adjustment shaft 79 adjacent the end wall 13. A worm gear cap 84 is rigidly secured to the end wall 13 of the housing 11 to define therewith a worm gear compartment 85, which is axially aligned with the periphery of the gear 83. A worm gear shaft 87 is rotatably supported upon bearings 88 and 89 in the end wall 13 and in the axial wall 92 of the worm gear cap 84, respectively. The shaft 87 extends through the end wall 13 where a pinion 93 is supported upon and secured to said shaft 87. The teeth of pinion 93 are engaged with the teeth of the gear 83, so that rotation of the worm gear shaft 87 effects rotation of the adjustment shaft 79.

A worm gear 94 (FIGURE 4) is mounted upon the worm gear shaft 87 within the compartment 85. A worm shaft 96 is rotatably supported within the walls of the worm gear cap 84 so that the worm 97 secured upon the worm shaft 96 is in continuous engagement with the teeth of the worm gear 94. The lower end of the worm shaft 96 projects downwardly through the worm gear cap and has an adjustment head 98, which is engageable by a wrench for rotating said shaft 96, hence the adjustment shaft 79.

A spring cage 101 (FIGURE 3) is comprised of a pair of annular side plates 102 and 103 which encircle the adjustment shaft 79 in spaced parallel relationship. The side plate 102 is rigidly secured to the flange of the flanged collar 74 on the transmission shaft 71. The side plate 103 is rotatably supported upon the adjustment shaft 79 by bearing structure 104. The side plates 102 and 103 are interconnected near corresponding points on their circumferences by a plurality of parallel tie rods 106. The end wall 13 of the housing 11 is rigidly secured to the partition 14 by a plurality of connecting rods 107 which extend through the end wall 13 and are threadedly received into the partition 15 adjacent the inner surface of the circumferential wall 108 of the power compartment 19. Said connecting rods 107 preferably, but not necessarily, extend through sleeves 109 which are rigidly connected, as by welding, to the inner surface of the circumferential wall 108.

A plurality of power spring units 112, 112a and 112b (FIGURE 3) are disposed within the spring cage 101 in side-by-side relationship. Although three spring units 112 are disclosed in this particular embodiment, it will be recognized that one or more of the spring units may be used. The spring unit 112 (FIGURE 5) is comprised of a collar 113 which encircles the adjustment shaft 79 and is held against rotation with respect thereto by the key and keyway structure 114. The collar 113 is encircled by a coil spring 116 having an integral hook 117 at its inner end, which hook is slidably and removably receivable within the groove 118 in the collar 113. The power spring 116 has a similar, integral hook 119 on its outer end which faces the opposite rotational direction from the hook 117.

A lever 122 (FIGURE 5) is pivotally supported near one end upon one of the tie rods 106 adjacent the radially outer surface of the spring 116 of spring unit 112. Said lever 122 has a transverse slot 123 between its ends into which the hook 119 of said spring 116 is slidably and removably receivable for pivoting the free end of the lever 122 toward the spring 116 when tension is placed thereon. An actuating spring 124 encircles the tie rod 106 adjacent the lever 122 so that, as shown in FIGURES 5 and 6, one end of the spring 124 extends under the lever 122 near the slot 123 and the other end of the spring extends over an adjacent tie rod 106a. Accordingly, when the tension is released from the power spring 116, the actuating spring 124 pivots the lever 122 so that its free end is urged radially outwardly beyond the outer edge of the cage 101. In this extended position, said lever can engage the first sleeve 109 which it approaches and thereby positively prevent further rotation of the cage 101 with respect to the adjustment shaft 79, hence with respect to the housing 11. The rotation thus stopped prevents an unwinding rotation of the drum 32 connected to said cage through the transmission shaft 71, the gears 77 and 78 and the drum shaft 32.

The lever 122 (FIGURE 3) is limited in movement along the tie rod 106 in one axial direction by the lock collar 126 and in the other axial direction by the actuating spring 124 and the lock collar 127.

The spring units 112a and 112b may be comprised of inner collars 113a and 113b which are engaged by power springs 116a and 116b, respectively, which are in turn connected to levers 122a and 122b, respectively, in substantially the same manner as set forth above in the detailed disclosure of the spring unit 112.

Operation

When the apparatus of the invention is assembled and suspended in the position disclosed in FIGURES 1, 2 and 3, it may be placed in operation by connecting the cable 38 to the load 10. Under normal circumstances, the spring units 112, 112a and 112b will have been selected in advance to apply approximately the amount of torque to the cage 101, hence the drum 36, which will balance the load 10 in a suspended position within the normal and useful range of such suspension beneath the housing 11. This can be accomplished by placing within the spring cage 101 the proper quantity and sizes of spring units. The potential power of the springs 116, 116a and 116b can also be varied by the ratio between the gears 77 and 78.

Close adjustments in the combined strength of the spring units 112, 112a and 112b can be effected by rotating the worm shaft 96, which controls the preloading of the springs 116, 116a and 116b. More specifically, the drum 36 is held against rotation, as by moving the stop post 66 into the post recess 68, during the mounting of the load 10 and until the initial preloading is completed. Then, the post 66 is disengaged from the drum 36 and fine adjustments are made. That is, the worm shaft 96 is rotated in the proper direction so that the worm 97 effects a rotation of the worm gear 94 and worm gear shaft 87. This causes the pinion 93 to rotate the gear 83, hence the adjustment shaft 79, with respect to the cage 101. The tension upon the power springs 116, 116a and 116b within the spring cage 101 is thereby increased or decreased, depending upon the direction of rotation. After these adjustments are made, the balance reel is ready for normal operation. As long as minimum amount of tension is maintained upon the power springs 116, 116a and 116b, their respective levers 122, 122a and 122b, respectively, will be held in their inoperative positions, as illustrated in FIGURE 5 with respect to the lever 122.

As the load 10 (FIGURE 3) is raised and lowered, the cable 38 is wound upon and unwound from the drum 36. The tension upon the power springs 116, 116a and 116b is decreased and increased, respectively, but this is compensated for in a conventional manner by the conical shape of the drum 36 and the volute form of the groove 37 in which the cable 38 is disposed. Thus, the load 10 can be manually and easily moved upwardly and downwardly with respect to the housing 11 into a variety of different positions, where such load will tend to remain in a balanced condition until again moved.

Just before the cable 38 is substantially completely unwound from the drum 36, the cable will release the pawl 54, whereby said pawl will engage the stop member 64 and thereby prevent further unwinding of the cable. Rewinding of the cable 38 upon the drum 36 automatically deactivates the pawl 54.

By appropriate selection of the ratio between the gears 77 and 78, the actual total strength of the springs 116, 116a and 116b can be much less than the strength which would be required if these springs were directly connected to the drum shaft 32. Accordingly, the cost of the power springs for a given load and the size of the housing 11 containing such springs can be greatly reduced from the corresponding cost and size of existing balance reels for the same load.

If any one or more of the power springs, such as the spring 116, should fail, the release of the tension on such spring immediately permits the actuating spring 124 associated with its lever 122 to move such lever radially outwardly beyond the periphery of the cage 101. In this position, the lever 122 will engage the sleeve 109 on the first connecting rod 107 which said lever approaches as the cage 101 begins to rotate in the unwinding direction, due to the failure of the spring. Accordingly, an otherwise dangerous drop of the load 10 is stopped, almost before it can get started, by the engagement of the lever 122 with a sleeve 109.

Although a particular preferred embodiment of the invention has been disclosed above for illustrative purit will be understood that variations or modifications of such disclosure, which come within the scope of the appended claims, are fully contemplated.

What is claimed is:

1. An apparatus for suspending an article, comprising:
   a frame structure;
   a drum rotatably supported upon said frame structure;
   an elongated element connected to said drum and connectible to the article;
   shaft means rotatably supported upon said frame structure;
   gear means connecting said shaft means to said drum for simultaneous rotation thereof;
   annular means concentrically secured to said shaft means;
   coiled spring means secured near its inner end to said frame structure;
   connecting means supported upon said annular means and connected to the outer end of said spring means, whereby rotation of said annular means is urged in one direction;
   stop means on said frame structure engageable by said connecting means; and
   actuating means responsive to a failure of said spring means for urging said connecting means into engagement with said stop means whereby rotation of said annular means is opposed in the other direction.

2. An apparatus for suspending an article, comprising:
   a frame structure;
   a drum rotatably supported upon said frame structure;
   an elongated, flexible element connected to said drum and connectible to the article;
   shaft means rotatably supported upon said frame structure;
   gear means connecting said shaft means to said drum for simultaneous rotation thereof;
   spring means connected to said frame structure;
   pawl means connected to and rotatable with said shaft means, said pawl means being connected to said spring means;
   abutment means on said frame structure engageable by said pawl means to obstruct the rotational movement of said shaft means whereby said drum is rotated in an unwinding direction; and
   actuating means responsive to a failure of said spring means for urging said pawl means into engagement with said abutment means, said spring means urging rotation of said drum through said shaft means in the winding direction, and holding said pawl means away from said engagement with said abutment means.

3. The structure of claim 2 including brake means on said drum and stop means on said frame structure engageable by said brake means in response to a substantially complete unwinding of said elongated element from said drum, whereby further unwinding of said element from said drum is positively opposed.

4. An apparatus for supporting a heavy load in static equilibrium, comprising:
   a housing structure and wall means therein defining first and second end compartments on opposite sides of a central compartment;
   first shaft means rotatably supported within the first end compartment and extending into the central compartment;
   second shaft means rotatably supported in the central compartment and extending into the second end compartment, said first and second shaft means being parallel, and their axes being radially spaced to define a substantially vertical plane;
   gear means connecting said first shaft means to said second shaft means for simultaneous rotation thereof;
   mounting means intersected by said plane and connected to said housing structure for supporting same;
   a conical drum mounted upon and secured to said first shaft means within said first end compartment;
   cable means connected at one end thereof to said drum, the other end of said cable means being connectible to the load;
   guide means on said housing structure externally of and below said first end compartment for guiding said cable means;
   post means rigidly secured to said housing structure and extending into said second end compartment coaxially with said second shaft means;
   a plurality of coil springs encircling said post means and rigidly secured at their inner ends to said post means;
   cage means secured to said second shaft means within said second compartment and connected to the outer ends of said coiled springs, whereby rotation of said drum in an unwinding direction is resiliently opposed by said coil springs, and said load is thereby suspended in static equilibrium.

5. The structure of claim 4 including lever means pivotally supported upon said cage means;
   stop means on said housing structure engageable by said lever means in one position thereof for opposing rotation of said cage means with respect to said post means in a direction contrary to the urging of said coil springs; and
   actuating means on said cage means urging said lever means into said position in response to a failure of said coil spring.

6. In an apparatus having a drum connected to a cable for supporting a load in static equilibrium and housing structure rotatably supporting said drum, mechanism for controlling the rotation of said drum comprising:
   shaft means rotatably supported in said housing and connected to said drum for rotating same;
   cage means connected to said shaft means;
   a pivot rod secured to said cage means, said rod being radially spaced from and parallel with said shaft means;
   a coil spring within said cage means and substaantially coaxial with said shaft means, the inner end of said spring being connected to said housing structure;
   a lever pivotally supported upon said pivot rod and connected to the outer end of said coil spring;
   stop means on said housing engageable by said lever when said lever is in an outwardly extending position, said coil spring urging said lever inwardly away from said position;
   resilient means on said cage means urging said lever into said position in response to a failure of said coil spring, whereby the said urging of said coil spring is substantially reduced.

7. An apparatus for supporting a heavy load, comprising:
   a housing structure;
   shaft means rotatably supported within said housing structure;
   a conical drum connected to and rotatable with said shaft means;
   cable means connected at one end thereof to said drum, the other end of said cable means being connectible to the load;
   mounting means connected to said housing structure for supporting same;
   post means rigidly secured to said housing structure and extending substantially coaxially with said shaft means;

coiled spring means encircling said post means, said spring means being secured at the inner end thereof to said post means;

annular means secured to said shaft means and rotatable therewith within said housing structure;

connection means supported upon said annular means and connected to the outer end of said coiled spring means, whereby rotation of said annular means is urged in one direction;

stop means on said housing structure engageable by said connection means for opposing rotation of said annular means in the other direction, said connection means being held by said spring means away from engagement with said stop means;

actuating means for urging said connection means into engagement with said stop means upon the failure of said coiled spring means, whereby rotation of said drum in an unwinding direction is stopped.

8. An apparatus for supporting a heavy load in static equilibrium, comprising:

a housing structure having wall means defining a compartment;

first shaft means rotatably supported upon said housing structure;

second shaft means rotatably supported upon said housing structure and extending into said compartment, said first and second shaft means being parallel and radially spaced from each other;

gear means connecting said first and second shaft means for simultaneous rotation thereof;

mounting means connected to said housing structure for supporting same;

a conical drum mounted upon and secured to said first shaft means near said compartment;

cable means connected at one end thereof to said drum, the other end of said cable means being connectible to the load;

coiled spring means disposed within said compartment and substantially coaxial with said second shaft means;

mounting means securely connecting the inner end of said coiled spring means to said housing structure;

annular cage means coaxially secured to said second shaft means within said compartment and connected near its radially outer edge to the outer end of said coiled spring means, whereby rotation of said drum in an unwinding direction is resiliently opposed by said coiled spring means and said load is thereby suspended in static equilibrium.

9. The structure of claim 8 including connection means pivotally secured upon said annular cage means near its outer edge and to said outer end of said spring means;

stop means on said housing structure engageable by said connection means in one position thereof for opposing rotation of said annular means with respect to said housing structure in a direction contrary to the urging of said coiled spring means; and resilient means on said annular means urging said connection means into said position thereof in response to a failure to said coiled spring means.

References Cited in the file of this patent
UNITED STATES PATENTS

| | | |
|---|---|---|
| 1,061,749 | Jennings | May 13, 1913 |
| 1,933,925 | Norling | Nov. 7, 1933 |
| 2,923,491 | Fischer et al. | Feb. 2, 1960 |
| 2,939,680 | Powell | June 7, 1960 |
| 2,958,509 | Mitchell | Nov. 1, 1960 |